United States Patent [19]

Lee et al.

[11] Patent Number: 4,956,791
[45] Date of Patent: Sep. 11, 1990

[54] MERGING PATTERN-MATCHING NETWORKS INCLUDING RETES

[75] Inventors: Ho S. Lee, Mount Kisco; Marshall I. Schor, Katonah, both of N.Y.

[73] Assignee: International Business Machines Corp., Armonk, N.Y.

[21] Appl. No.: 272,097

[22] Filed: Nov. 14, 1988

[51] Int. Cl.$^5$ ............................................. G06F 15/18
[52] U.S. Cl. ..................................................... 364/513
[58] Field of Search ...................... 364/513, 200, 274.1, 364/275; 382/14, 15

[56] References Cited

U.S. PATENT DOCUMENTS

| 4,761,748 | 8/1988 | Tano et al. | 364/513 |
| 4,837,735 | 6/1969 | Allen, Jr. et al. | 364/200 |
| 4,849,905 | 7/1989 | Loeb et al. | 362/513 |

OTHER PUBLICATIONS

Forgy "RETE: A Fast Algorithm for the Many Pattern/Many Object Pattern Match Problem"; Artificial Intelligence, vol. 19 pp. 17-37, North Holland 1982.
Brownstone, Efficiency In OPSS pp. 228-239, Addison-Wesley QA76.9.E96P76, 1985.
Schor et al., "Advances in RETE Pattern Matching" Science pp. 226-232, Proceedings of 1986 American Association for Artifial Intellegience 1986.

Primary Examiner—Allen MacDonald
Attorney, Agent, or Firm—Herb Somermeyer; R. Bruce Brodie

[57] ABSTRACT

A pattern-matching network is merged with an existing RETE network without recompiling the whole network, while still matching existing data. Permanent, temporary, full and partial merging operations are described, depending on the origination of match patterns among LHS, on demand (procedural programming), or top level. The merge process combines functionally identical nodes from the networks for reducing the number of nodes in the resulting network. The merger process produces so-called alpha and beta synapse nodes; alpha synapse nodes have pointers to top nodes, while beta synapse nodes consist pointers to a drain node, which is a node in the grafted RETE portions of the resulting network and to source memory nodes in the pre-existing RETE network. The algorithm for obtaining a set of synapse nodes without duplication of any logic connecting paths is described. The synapse nodes are used in updating a grafted network, also can be a suspended portion, upon completion of the merger. Two network updating algorithms are presented.

17 Claims, 5 Drawing Sheets

MERGING PATTERN-MATCHING NETWORKS INCLUDING RETES

DOCUMENT INCORPORATED BY REFERENCE

Co-pending commonly-assigned application for patent Ser. No. 07/272,135 filed Nov. 14, 1988, entitled "Updating Pattern Matching Networks", is incorporated by reference for showing preferred network updating steps occurring after a pattern matching network merger.

FIELD OF THE INVENTION

The present invention relates to pattern-matching networks, particularly to methods of merging such networks and resultant networks, including modularly changeable networks, and on-demand updating of predetermined portions of pattern matching networks.

BACKGROUND OF THE INVENTION

So-called artificial intelligence or pattern-matching programming has been developing and used over the last several years, such as the RETE taught by Forgy. The RETE algorithm is one of several approaches to pattern-matching using set(s) of matching rules. These programs are well known, see the description by Charles L. Forgy in "RETE: A Fast Algorithm for the Many Pattern/Many Object Pattern Match Problem", ARTIFICIAL INTELLIGENCE, Volume 19, 1982, pp 17-37. Another example of the public knowledge in this area is found in an article by Marshall Schor et al. in "Advances in RETE Pattern Matching", PROCEEDINGS of 1986 AMERICAN ASSOCIATION for ARTIFICIAL INTELLIGENCE CONFERENCE, pp 226-232, 1986. The well known information about RETE networks and artificial intelligence programming is not repeated herein except as needed for one of ordinary skill in this art to understand the present invention. As set forth by Forgy, the network defined as a RETE exhibits certain performance advantages when large numbers of data pattern matches have to be performed. As these networks get larger and more complex, enhancing performance and functionality becomes increasingly important. It is desired to not only enhance performance, but also to enhance functionality of a pattern matching network.

As is well known, such pattern-matching programming executes with a plurality of data structures. A working memory element (WME) is an input data structure. Any new, modified or removed WME results in a "token" (or delta), which is a data structure composed of one or more WMEs together with an associated data operation. Since the current informational content of the RETE does not reflect the WME addition, change or deletion, the RETE needs to be updated by propagating the token through the network such that it reflects the current informational state of the inputs. Each time a token is pushed (processed) through a RETE and is matched with patterns in a RETE constitutes a pattern match operation.

A RETE, as taught by Forgy, consists of alpha and beta portions. When a change token is processed through the RETE, the alpha portion is first traversed after the informational content of a new or changed WME or the informational change resulting from a deleted WME is made available to the network through a "root node". A root node is a data area of the network that is the entry point to the RETE. A set of "top" nodes are connected to the root node. These in turn are connected to successor nodes, finally reaching a plurality of termination or bottom nodes, termed production or match nodes. Each of the node data structures may include match tests for incoming tokens. As known in the art, some of the nodes have memory items to be scanned in a table. These may be implemented as separate nodes, termed "memory nodes", or the tables may be directly associated with nodes representing match operations. The associated memory table for a particular node will be referred to as that node's "result memory". Result memory tables are associated with beta nodes and alpha distribution nodes which will be described later.

The tables for memory items contain values (numeric, text, etc) which represent partial matching results up to that point in the network. These values may be used in subsequent matching operations as one of the inputs to a "join" node. It is to be understood that table accesses follow usual programming procedures and that the matching operations are usual programming effected comparisons.

The alpha portion of a RETE has no result memories, i.e. tables wherein partial pattern matching results are stored; in contrast the beta portion includes such memory tables. In between the alpha and beta portions are nodes called alpha distribution nodes, all of which have result memories which store the partial pattern matching results generated in the alpha portion. From these alpha distribution nodes, the tokens are pushed into the beta portion.

There are two kinds of nodes used in a RETE in terms of the number of input connections: one input nodes and two input nodes. All alpha nodes (as do later described production nodes or match nodes) have one input as do the alpha distribution nodes. We here will refer to such one input as "RHS input" or simply "input". In contrast most beta nodes, except production nodes, match nodes, and other special purpose nodes, have two inputs: left hand side (LHS) and right hand side (RHS) inputs. Such two input nodes are called "join nodes" since token pairs (consisting of input from each side) which pass the join tests (which may be no test at all) are joined together (AND function join nodes as described herein, no limitation thereto is intended), resulting in new amalgamated tokens which are used to update the associated result memory table of the join node.

The RETE algorithm starts with a change token, representing the addition, modification, or deletion of a WME; the program executing the algorithm then scans a plurality of alpha nodes for matching the contents of the change token with match informational items of the respective alpha nodes, as required. That is, each alpha node tests various aspects of the WME as represented by the token, and passes or blocks (does not pass) the token on to various successors of the alpha node. This action continues as is well known in the prior art, until the bottom of the alpha node portion is reached. At this point, assuming the alpha node tests were successful, the first result memory (the alpha distribution node) receives the token, and may update its memory in accordance with the particular WME and operation (add, modify, or delete). On the other hand, if the token testing resulted in test failures (no matches), then the token passing may not extend to the bottom of the alpha portion. The token passing may involve a plurality of logic paths, as is known. Following these pattern matching operations, the beta portion of the RETE continues the RETE operations. For a token arriving at one input of a prototypical beta join node, the node specifies pattern matching functions between the token contents and the set of partially matched tokens contained in the result memory found at a predecessor node logically connected as a source node to the opposite input of the join node. Then the program conducts tests between the token and the result memory as defined in the join node. Such a result memory is termed an "opposite memory".

The RETE is compiled from a set of pattern-matching rules. Each rule defines a logic path through the RETE from the root node to an output node. The rule defined path through a RETE typically becomes quite complex. As a result, as practiced in the prior art, once a RETE is compiled it is a relatively static structure, excepting for updating the result memory tables. It is desired to make a RETE and other pattern matching networks more flexible and changeable.

DESCRIPTION OF THE PRIOR ART

Generally the above-described RETEs do not exhibit the ability to correctly merge new RETE portions such that the merged RETE shares nodes where possible with the merged-with RETE while the non-mergeable and therefore non-shared portions of the new RETE are correctly initialized with existing partial match information from existing result memories in the merged-with RETE. It is desired to increase the functionality of pattern-matching networks to allow demand driven and dynamic changes to be made without recompiling and then updating the entirety of a new pattern-matching network.

As reported in a Stanford University Technical Report of the Department of Computer Science by Dan Scales, entitled "Efficient Matching Algorithms for the SOAR/OPS5 Production Systems" 1986, a conventional OPS5/RETE, as described above, was made more efficient. This teaching does not teach nor suggest a demand driven or modularly updatable pattern-matching network.

SUMMARY OF THE INVENTION

It is an object of the present invention to provide demand driven pattern matching in a pattern matching network.

It is another object to provide efficient and rapid mergence of input pattern matching data structures with an existing pattern matching network.

A merger of two pattern-matching networks results in adding a minimal number of data structures by merging predetermined ones of the newly added structures (herein termed nodes) and attaching all newly added but not mergeable nodes into the existing network. Updating the modified network produces a correct result in that no duplicate nor missing pattern match results are created.

It is another object of the present invention to provide for different merging modes depending on the origination of match patterns. The origination of match patterns may be: condition part of rules (generally called "LHS part of rules"), on-demand pattern matching constructs, which may come from the action part of rules, or from arbitrary procedural programming code, or top level, that is, on demand patterns entered by a user, with no possibility for reuse.

The span (duration in time) of mergence may be "permanent" or "temporary". A new RETE (which will be called a mini RETE) which is merged with an existing RETE in the permanent mode becomes an integral portion of the resulting merged network. On the other hand, mini RETEs grafted in a temporary manner to an existing RETE are available only upon demand. The non-merged portions of these RETEs are not permanently connected to the merged-with RETE. For temporary mergence, synapse nodes may or may not be saved, depending on the reuse possibilities of the merged RETE. Top level pattern matching requests create synapse nodes that are not saved, while on demand patterns in the action part of a rule are saved, for example.

The foregoing and other objects, features, and advantages of the invention will be apparent from the following more particular description of preferred embodiments of the invention, as illustrated in the accompanying drawings.

DETAILED DESCRIPTION

Referring now more particularly to the appended drawing, like numerals indicate like parts and structural features in the various figures. A publicly known programming language in which the following and preceding programming steps may be implemented is "Common LISP"; see Guy L. Steele, Jr., "COMMON LISP" by the Digital Press, 1984 (QA76.73.L23573 1984 ISBN 0-9 32376-41-X). A known RETE algorithm is described by Brownstone in PROGRAMMING EXPERT SYSTEMS IN OPS5, Addison-Wesley Publishing Company pp 228-239, 1985. Prior pattern matching systems, as well as the preferred embodiment, employ digital computers (not shown) wherein the data structures constituting the skeleton of the pattern matching network are stored in the storage portions of the digital computer. All of the figures illustrate portions of the stored structures in detail for giving an understanding of the present invention.

Figure 1:
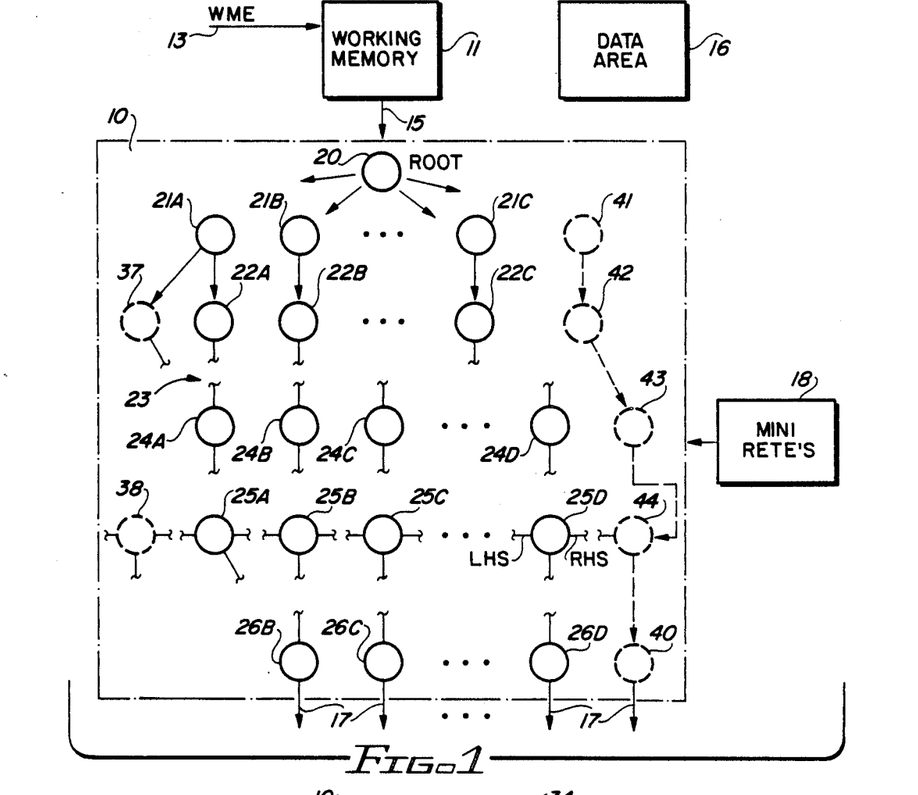
FIG. 1 is a simplified diagrammatic showing of a RETE with ancillary data structures illustrating pattern matching network mergers in accordance with the present invention.

In FIG. 1, RETE 10 is logically driven (via program execution, as is known) by changes to working memory 11 (working memory 11 is a program designated portion of the digital computer storage for storing control and input data elements of a RETE system). The control and data inputs are termed Working Memory Elements (WMEs) received into the working memory 11, as indicated by arrow 13. WMEs can be added to, deleted from or changed in the working memory 11. Each such addition, deletion or change results in the contents of the working memory 11 being different from the current status of RETE 10. Remember, RETE 10 stores partial pattern matching results in memory nodes, later described. This difference or delta between working memory 11 and RETE 10 is represented by "tokens", as known in the art. A token represents one change (addition, update, or modification) to one WME. The token is transferred by program control as indicated by arrow 15 from working memory 11 to a root node 20 of RETE 10. Once the token is lodged in root node 20, the known RETE program (not shown) scans the top RETE input nodes (alpha portion data structures shown in FIG. 3) 21A . . . 21C. In a practical embodiment there may be a large number of such RETE input nodes. When a token passes the pattern match test associated with any of the RETE nodes, then the pattern matching operations proceed further down into the RETE from that RETE node. For example, a match at node 21B results in pattern matching operations next occurring at node 22B. Alpha nodes 21A . . . 21C and 22A . . . 22C represent the alpha portion of the RETE as taught by Forgy, supra. In such alpha portion, several tiers or layers of alpha nodes, diagrammatically shown by space 23, are traversed from a single RETE input node. The logical bottom of the alpha portion consists of a set of alpha distribution nodes 24A . . . 24D. The alpha nodes, which in the illustrated embodiment do not store partial pattern matching results, perform pattern matching operations as are known. Tokens passing the pattern matching tests in the alpha nodes are stored in the alpha distribution nodes which respectively terminate the lower boundary of the alpha portion of the RETE.

Alpha distribution nodes 24A . . . 24D are the uppermost (logically closest to root node 20) nodes having result memory in the RETE. Such nodes can be designated as beta synapse source nodes as described later.

All of the nodes logically below the alpha distribution nodes, termed beta nodes, constitute the beta portion of the RETE. Many beta nodes are join nodes having two inputs. Each join node has an LHS and an RHS input, as shown for beta join node 25D. The other beta nodes 25A . . . 25C have similar inputs as indicated by the respective truncated horizontal lines at each of the illustrated beta nodes. Change tokens can be passed to a join node through either the LHS or RHS inputs. The passed token constitutes a set of argument values to be compared with a plurality of argument values from the opposite memory (a result memory at a predecessor node connected to the opposite input (i.e., RHS or LHS)) using predicate tests specified in the join node. If all tests are passed, conducted, the token is passed to appropriate successor nodes.

The lower or bottom boundary of RETE 10 consists of output nodes 26A . . . 26D which include the so-called production nodes. Except for the output nodes, all nodes in the RETE can have successor nodes (nodes traversed by the RETE program in a pattern matching operation subsequent to the traversal of a current node). Predecessor nodes are those nodes traversed prior to traversal of a given node. Alpha nodes are predecessor nodes to their respective alpha distribution nodes; beta nodes are successor nodes to alpha distribution and alpha nodes; beta nodes can be predecessor nodes to other beta nodes, etc. The data used in the pattern matching tests, the actual data structures and test definitions are all stored in data or memory area 16. The data contents of the RETE include pointers to the appropriate data structure in data area 16.

In accordance with one aspect of the invention, one or more mini RETEs or mini networks 18 are merged into or grafted onto RETE 10, termed the existing, original or main RETE. The later described dashed line structures are a simplified showing of such mergers and on-demand pattern matching which are described after the merger process of the preferred embodiment. A mini RETE is a separately constructed RETE network corresponding to various patterns, such as the RETE constructed from a rule.

In accordance with an aspect of the present invention, a set of special nodes, called "synapse nodes", are created for purposes of updating a "suspended" portion of the RETE after a merger operation has changed the RETE construction. Such suspended portion can be the nodes grafted into an existing RETE (also termed a main RETE), nodes that are selectively updated (as will become apparent,) and the like. The RETE updating is current up to a set of nodes called "source nodes". The first nodes in a suspended portion of a RETE are called "drain nodes". The term "source" and "drain" are apt for the beta portion of the RETE; it is intended that these terms for the alpha portion respectively indicate an immediate predecessor and an immediate successor node to the stop node. The synapse nodes identify couplings between designated source nodes and drain nodes. Successor nodes and drain node(s) in a suspended portion of the RETE may have been newly grafted or added to the RETE have not yet been updated to the current status of the RETE. Such synapse nodes designate the source updating point (or points in the instance of a two input join node) for the suspended portion of the RETE.

Data tables in the result memories contain argument values (numeric, text, and so forth, being in fact, any arbitrary data structure) for pattern matching comparisons in a beta join node with the token contents in accordance with test definitions stored in the beta join node. It is to be understood that table accesses follow usual programming procedures and that the matching operations are usual programming effected comparisons.

In the beta portion, each of the join nodes have two inputs; a left hand side (LHS) input and a right hand side (RHS) input. The output of the join node consists of tokens representing successful pattern matches between input tokens and opposite-side result memory tokens.

In accordance with an aspect of the present invention, two kinds of synapse nodes are constructed: "alpha synapse nodes" and "beta synapse nodes". These serve to identify the manner and location where a new RETE is attached to an existing RETE, for sharing partial match information that may be already calculated and present in the existing RETE. These synapse nodes are used for purposes of updating a suspended portion of the RETE after a merger operation has changed the RETE construction.

Such suspended portion can be the nodes grafted into an existing RETE, nodes that are selectively updated (as will become apparent) and the like. Beta synapse nodes identify sets of RETE nodes: each beta synapse node associates one or two "source" nodes with a "drain" node. A source node is a node in the merged-with RETE; the drain node is a node in the new RETE being merged with the existing RETE. Alpha synapse nodes identify mini RETE top nodes, as later described, as drain nodes whose "source" are the WMEs associated with a particular top node.

The RETE updating is current up to the source nodes identified in such synapse nodes; the successor nodes which are in a suspended portion of the RETE (including any newly grafted or added nodes in the RETE) are not updated to the current status of the RETE. The source nodes become the source updating point for the suspended portion of the RETE.

Upon completion of the merger process, the grafted pattern matching network is updated by using the set of synapse nodes(source node to drain node connecting nodes) created during the merger. There are two kinds of update algorithms: one which does not need send ordering, and second one which does need ordering, but has an optimized performance. The first updating algorithm is the generalized update algorithm as described in the co-pending application for patent, where source nodes are "stop" nodes, and drain nodes are "resume" nodes. The source nodes and their successors in the beta portion of the suspended RETE are identified by the list of beta synapse nodes. Another update algorithm does need to specify a token send order, but is more efficient both in space and time. This update algorithm causes the executing program to first sends tokens stored in later defined "left source nodes" (a part of beta synapse nodes) to drain nodes in an ascending order, skipping the shadowing and sending to right successor nodes steps in the general update algorithm. Sending tokens from nodes in an ascending order is defined in detail in co-pending commonly assigned application for patent by Ho S. Lee et al. Updating a network through addressed beta synapse nodes begins with sending tokens to a drain node (called a resume node in the co-pending application for patent) from the lowest level left source node (a source node logically connected to a lowest level drain node among all drain nodes in the suspended RETE to be updated). A succession of pushing tokens from left source nodes to connected drain nodes in an ascending manner completes the first step in the update process. The logical order of drain nodes can be obtained as a by-product of the merge algorithm without extra search efforts. In case there is no clear ordering between two drain nodes, then the order of sending tokens to these two drain nodes is arbitrary. As the second step, WMEs associated with the alpha top (source) nodes specified by the alpha synapses are sent to their successors in an arbitrary order. Using the optimized update algorithm improves run-time performance.

Figure 2:
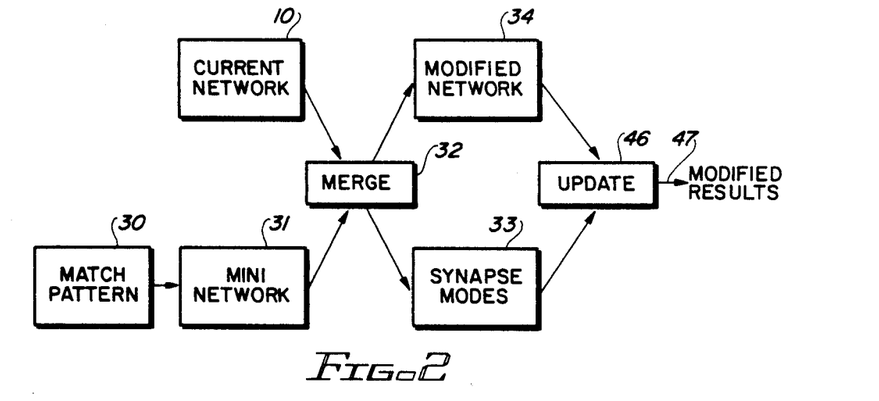
FIG. 2 is a simplified flow diagram illustrating the steps performed in a merger process for the FIG. 1 illustrated network.
Figure 4:
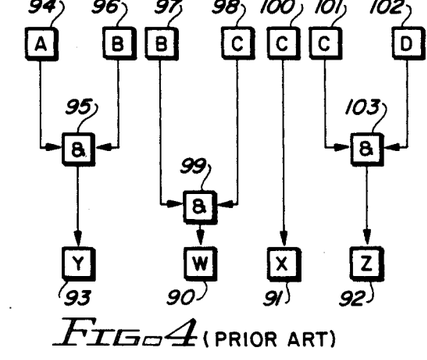
FIGS. 4 and 5 illustrate a merging of pattern matching rule networks into a RETE as practiced in the prior art.
Figure 6:
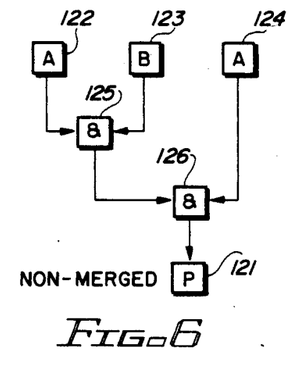
FIGS. 6 and 7 illustrate self-mergence of a mini RETE network.

FIG. 2 illustrates the machine operations which effect the pattern matching network merges in accordance with the preferred embodiment. It is assumed that match patterns at machine step 30 have been constructed, as is known. FIGS. 4 and 6 illustrate the results of such match patterns; such match patterns may, in some instances, constitute one rule of the RETE, no limitation thereto intended.

A mini-network is created from the match patterns using well known methods for constructing RETE networks from such patterns. The resultant mini-network may or may not be self-merged, either being covered by this invention. Self merged networks are those wherein higher level nodes (i.e., nodes closer to the root node) are shared where possible, resulting in those shared nodes having multiple successor nodes.

Figure 3:
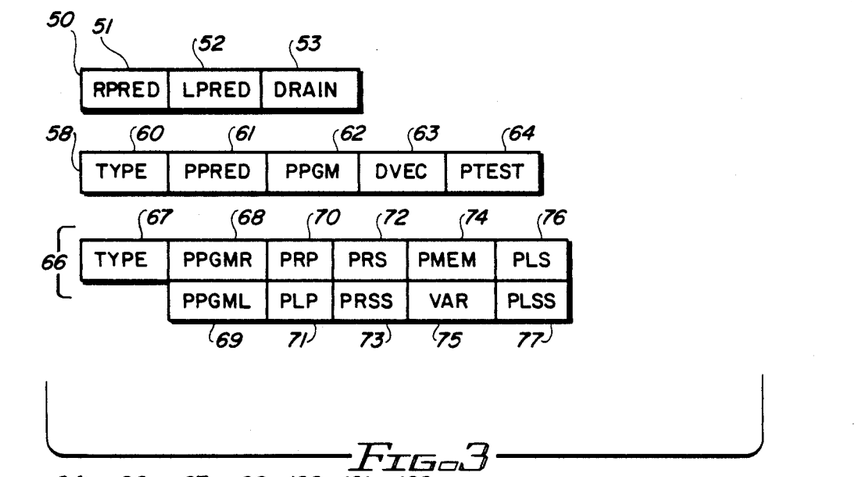
FIG. 3 diagrammatically illustrates a simplified set of control data structures used in connection with the FIG. 2 illustrated merger process.

At machine step 32 the mini network created at machine step 31 is merged into the current or existing network 10. FIGS. 14 and 15 show more details of the merger processing. As a result of the merger, the current network 10 may be augmented resulting in modified network or RETE 34 and may be used to supply information on-demand, and the like. As a part of the merge step 32, a set of synapse nodes 33 (FIG. 3 shows the data structural aspects of such synapse nodes) may be created. The synapse nodes identify the coupling point(s) between the lowest merged-with node(s), called source nodes, and the highest part of the mini network not merged, which is also the entry points into the suspended RETE portion, as described in the co-pending application for patent. Successor nodes to the lowest merged (nodes into which a mini RETE node was merged) original RETE nodes include nodes in the mini RETE which are attached to the respective lowest node of the modified network exhibiting mergence—the lowest existing node with which a mini RETE node was merged. None of the attached successor nodes from the mini RETE have been updated with any pattern matching information from any WME activity in working memory 11; therefore after the merger, there is an existing delta or difference between such successor nodes and the working memory 11 current status. It should be noted that the "source" node most probably will have other successor nodes that have been updated; such other successor nodes may have been in the RETE before the merger, or were updated to the current status of the working memory. Updating step 46 employs the just generated synapse nodes 33 to push tokens into the successor nodes of the merged mini RETE not yet updated by existing WME data 11, beginning at the above referred to source node or merge node, updating all grafted mini RETE successor nodes to all of the lowest merge nodes in each of one or sequences of nodes, as will become apparent. Such synapse nodes are also usable to provide a later described gating action for selectively updating the RETE nodes in a "suspended" portion of the RETE.

The dashed line data structures shown in RETE 10 are used to illustrate the need for partial updating modified network 34; details of the processes are shown in FIGS. 4 through 16. Some typical updates are illustrated; for example, an alpha node 37 from a mini RETE 18 is attached to alpha node 21A as one of immediate successor nodes of 21A. The output connection of the grafted node 37 is prior existing nodes or successor nodes (not shown) of node 37 in its mini RETE and carried with it from its mini RETE into modified RETE or network 34 as a "grafted RETE" portion. Node 37 had a RETE input node (not shown) in the mini RETE to an immediate predecessor node which had mergence with RETE input node 21A; therefore the mini RETE input node for node 37 was merged into existing RETE input node 21A and then discarded. The connection between node 21A output and node 37 input is by a so-called "merge link", later described, and the breaking of the link from the mini RETE predecessor to node 37 and node 37 is called a "merge break".

As another case of the alpha portion merger, a mini RETE may contain a top node 41 which may become a RETE input node upon merger and an intermediate alpha node 42, alpha distribution node 43, beta node 44 and output node (may be a production node or a match node) 40. None of the nodes may have mergence with any existing RETE node. The LHS input to beta node 44 may connect to a node in the RETE 10 which had mergence with the LHS predecessor node of beta node 44 in the mini RETE 18. As to nodes 40-44, no mergence was found for the illustrated nodes; hence all of these nodes are added to RETE 10; the added nodes are a grafted RETE portion.

For a particular alpha top node, if not all of the alpha portion of the mini RETE is successfully merged with the existing main RETE, then the top node of the partially merged alpha portion in the mini RETE becomes a source node designated by an alpha synapse node. For mini RETE networks which have been self-merged, multiple alpha synapse nodes designating the same alpha top source node are merged together, such that only one alpha synapse node per top node is created. During scanning the alpha portion of mini RETE to test possible mergence, if a merge test succeeds with an alpha distribution node, a forward pointer to the alpha distribution node from its predecessor node in the mini RETE is removed in order to achieve correct match results.

Consider next an instance wherein, for example, a memory node 38 is added to the beta portion of the existing RETE. Assume that a predecessor node of 38 is a beta node which is successfully merged with a node in the original RETE (not shown), i.e. the predecessor of 38 in the mini RETE 18 was merged into an existing beta node of main RETE 10. As such, beta node 38 is the upper most node of a portion of a mini RETE merged and is a beta node which exhibited no mergence with any existing beta nodes of RETE 10. Node 38 may have a network of successor nodes which terminate into either a production node (not shown) or a match node, which collectively comprises a grafted RETE. The immediate predecessor node of a node in a mini RETE, which has a merge link with a node in the main RETE, is called the "finally merged node" to signify that all successors of the finally merged node in the mini RETE can not be merged into the main RETE. For example, the immediate predecessor node of the node 38 in the mini RETE 18 is a finally merged node. If memory nodes in a mini RETE are merged with some of the existing RETE, then so-called "beta synapse node triple", each of which is of the structure as synapse node 50 of FIG. 3, is generated as later described for ensuring proper updating of RETE 10. The so-called "merger process" examines the mini RETE to establish an ordered set of mergeable nodes of the mini RETE with comparable nodes in the original RETE. This sequence is important as it affects the order and arrangement of later described synapse nodes to be created by the merger process. Nodes in the mini RETE are selected for merge testing in an order determined by scanning the predecessors of a node. For two input (e.g., join) nodes, the left predecessor is scanned before the right predecessors. The scan stops when top nodes have been reached.

The top node found in the scan in the mini RETE is tested for mergence with existing main RETE top nodes. The nodes can be merged if they perform the same pattern testing function. The comparison of nodes for same pattern testing function is a known algorithm currently practiced in OPS5 for the purpose of merging RETE nodes for new patterns as they are constructed. The object of the above described analysis and scanning is to find the point at which merging is no longer possible, starting from the top node(s) and continuing to the mini RETE bottom node. If a top node is mergeable, then its successor is tested. This continues until all nodes are merged, or a non-mergeable node is found. If a nodal merger occurs, all of the predecessor nodes in both the original RETE and the mini RETE also exhibit mergence. Nodal mergence is solely determined by predecessors, no successor nodes have any effect on mergence of a given node. A beta synapse node triple consists of three nodes: right source node, left source node, and a drain node. Left and right source nodes of a beta synapse node triple respectively point to the merge nodes in the main RETE, whereas the drain node points to a node located in the mini RETE. Before an action of merge break occurs, the drain node is the immediate successor node of the finally merged node in the mini RETE. The predecessor nodes to the finally merged mini RETE node, as well as the finally merged mini RETE node itself, are all merged—this means such predecessor mini RETE nodes are not incorporated into the resulting merged RETE in favor of reusing existing RETE structures already in the main RETE for the same effect. The immediate predecessor nodes of the main RETE merge node are not changed by this nodal merger. If the mini RETE represents a pattern being permanently merged into the main RETE, the original RETE node being merged into receives a new immediate successor node—a drain node which is the immediate successor node to the mini RETE finally merged node; that immediate successor node is now a drain node which is the top most node of the suspended or grafted RETE portion. This is the highest level node of the mini RETE in the logical path being analyzed to survive the merger and be connected to the original RETE source nodes (also called merge nodes).

The synapse nodes are stored permanently, if the mini RETE merged was built from a repeatable on-demand match pattern for future on-demand match operation whenever the match is requested. On demand match pattern grafting does not fully link newly designated drain nodes to the main RETE as normal RETE successor nodes of main RETE nodes; this selective logical connection prevents the pattern matching activity associated with the on-demand network from being processed when a WME data change occurs. This processing occurs when an "on demand" pattern-matching operation is initiated in the RETE.

For repeatable on-demand mini RETE patterns, a special link including a synapse node enables computation which excludes a suspended portion whenever a match pattern of the suspended portion is no longer used by any other pattern fragment (including any repeatable on-demand match pattern). This connection enables easy deletion of such unwanted match patterns for nodes having no successor nodes.

FIG. 3 diagrammatically illustrates data structures used in the explanation of the present invention. It is to be understood that in a practical embodiment of a RETE, or other types of pattern matching networks, many more data structures are used, as is known in the art. Beta synapse node 50 identifies the boundary of a grafted RETE (which is a suspended portion when the connecting synapse nodes are not being used). The synapse nodes selectively connect the original or main RETE to the grafted RETE as a "gate" to implement on-demand updating and for other purposes as will become apparent. Each beta synapse node 50 includes three pointers. The first field RPRED 51 has a pointer to a right predecessor node, the second field LPRED 52 has a pointer to a left predecessor node, and field DRAIN 53 has a pointer to a drain node. Field 51 or 52 (but not both) may be NIL for indicating the predecessor for the drain node on that side is not in the main RETE. There may be a predecessor node, but such predecessor node for a "nil" field 51 or 52 is in the mini RETE. Such predecessor node could not be merged with a main RETE node therefore remains in the mini RETE. In contrast to a beta synapse node, each alpha synapse node has a single pointer to an alpha top node. As such, an alpha synapse node only points to a drain node.

The drain node pointed to by a beta synapse node field 53 identifies a beta node of the mini RETE which is the highest node in the mini RETE path that is not merged into a main RETE node; i.e. could not be merged into the main RETE, therefore it remains in the grafted RETE portion. A drain node pointed to by a beta synapse node, when a join node, has two nodal inputs: an LHS input and an RHS input. All successors nodes to a drain node that were not merged into a main RETE node have to be in a grafted RETE, i.e. become a member node of a suspended RETE portion.

For mini RETEs representing new rules being added permanently to an existing RETE, the topmost mini RETE node in the string of nodes which cannot be merged into a main RETE node becomes an additional immediate successor node to the merge node of the original RETE; such merge node is the main RETE node into which the finally merged node of the mini RETE is merged. In the present described embodiment, each alpha synapse node points to a top node in the mini RETE as created. Since top nodes of the main RETE can have plurality of immediate successor nodes, having an alpha synapse node point to the mini RETE top nodes provides a way to propagate tokens to just the mini RETE portions while avoiding propagation of tokens to already initialized RETE portions in the main RETE. Such an alpha synapse node points to the (possibly self-merged) top nodes of the mini RETE for passing the token to the finally merged alpha node in the modified RETE. All of the alpha synapse nodes are preferably in an addressable linked list while all of the beta synapse nodes are in a separate addressable linked list (not shown). Each merger may have a separate addressable linked list for its alpha and beta synapse nodes, or one list can be provided respectively for all of the alpha and beta synapse nodes with offsets in the lists being pointed to for different logical connections indicated by the synapse nodes. After the updating step, synapse nodes are discarded except for mini RETEs whose source was repeatable on-demand pattern matches, such as a mini RETE constructed from an on-demand pattern matching request in the RHS action part of a rule. In case of an on-demand match pattern which might be used in repeated operations, the set of created synapse nodes are stored for later initiated updating operations.

Synapse nodes built for mini RETEs representing new permanently added rule patterns, or for on demand pattern matching where no repeatability is needed (such as a one time pattern match request), are used once; upon completion of the updating, they are discarded. Other mini RETE's merged into a main RETE can become a permanent part of such main RETE; i.e. are subsumed into the main RETE (synapse nodes identifying the resultant suspended portion are discarded and the merged mini RETE) has points to all of its predecessor nodes of the original main RETE. This means there are no designated source and drain nodes after completion of the merger and the first updating of the suspended portion.

An alpha portion node structure 58 (nodes 21C etc) includes type field 60 identifying the data structure as a RETE alpha node or as a top node. A PPRED field 61 in an alpha node stores an address pointer to its sole immediate predecessor node while in a top or input alpha node field 61 stores the identification of a class of the RETE or other top information suitable for identifying the input WMEs associated with this top node. PPGM field 62 stores an address pointer to unique program portion associated with the alpha node (this field may be blank). DVEC field 63 is a set of pointers to all of the immediate successor nodes (usually alpha nodes but could include alpha distribution nodes). PTEST field 64 stores a pointer for any tests to be conducted (usually no tests are conducted in a top node). The beta node data structure 66 (beta nodes 25A et seq as well as the alpha distribution node 24A et seq of RETE 10) includes type field 67 identifying the data structure as a beta node or as an alpha distribution node. PPGMR field 68 and PPGML field 69 respectively point to programming to be executed respectively with the RHS and LHS entries or inputs. Fields PRP 70 and PLP 71 respectively store address pointers to the right and left predecessor nodes. If there is no left or right predecessor node, then the respective field is blank (herein termed NIL). When the PRP field 70 is NIL, then PPGMR field 68 is also NIL; the same is true for fields 69 and 71. PRS field 72 contains a pointer to a data structure which identifies all right successor nodes, if any; if there are no right successor nodes then this field is NIL. PRSS field 73 contains a pointer to a data structure which identifies all non-temporary synapse nodes associated with this node, where the association is that this node is a right predecessor node of a on-demand drain node. PMEM field 74 stores an address pointer to the associated result memory of the beta or alpha distribution node being described. VAR field 75 contains an address pointer to data structures representing pattern matching test associated with this node, to be conducted by the RETE program when traversing this node. PLS field 76 stores an address pointer to a set of next immediate left successor nodes. There may be a large number of successor nodes identified in either PRS 72 or PLS 76. PLSS field 77 contains a pointer to a data structure which identifies all non-temporary synapse nodes associated with this node, where the association is that this node is a left predecessor node of a on-demand drain node. Except for the PRSS and PLSS nodes of 66, these structures are typical of those used in known RETE algorithms. Remember that alpha nodes are not memory or result storing nodes; alpha distribution nodes; beta join nodes and the bottom nodes are memory or result storing nodes; and synapse nodes provide only address pointing to other nodes which are designated as drain nodes or source nodes.

Figure 5:
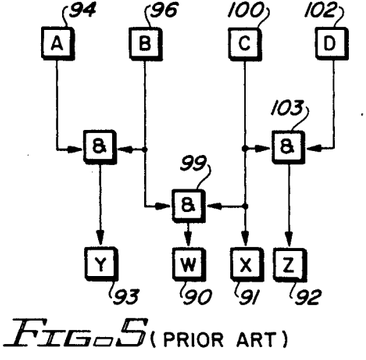

FIGS. 4 and 5 show a known RETE merging function used in connection with compiling rules into a RETE. FIG. 4 shows four compiled rules W, X, Y and Z respectively as bottom nodes 90-93. Such bottom nodes can be production nodes. Nodes 94, 96-98, 100-102 are alpha distribution nodes of the types A, B, C and D; these store WMEs passing pattern tests where all WMEs in A pass identical alpha tests, all WMEs in B pass identical but different alpha tests, etc. Beta join nodes 95, 99 and 103 constitute beta portions of the respective rules with rule X having no beta join nodes. Alpha nodes are omitted for brevity. To create a merged RETE from the separate mini RETEs representing rules W, X, Y and Z, all identical nodes are combined as a logic reduction step. Hence the two B nodes 96 and 97 are combined into the node 96 of FIG. 5 with the successor nodes 95 and 99 now having a common predecessor node B 96 (FIG. 5 only). Similarly the three C nodes 98, 100 and 101 of FIG. 4 are combined into single C node 100 (FIG. 5 only) which has three successor nodes 91, 99 and 103. Nodes A 94 and D 102 are kept as is. FIG. 5 represents a merged RETE of the rules shown in FIG. 4. The merged FIG. 5 illustrated RETE can be updated by pushing tokens from the top root node, as is known. The LHS inputs are represented in FIGS. 4 and 5 as the left input arrows to the symbols, the RHS inputs are represented as the right input arrows to the symbols. The top inputs are the top nodes 21A et seq of RETE 10 (FIG. 1).

In accordance with the present invention, additional rules can be grafted into an existing RETE, the grafted portion being updatable using synapse node pointers. Such synapse nodes are used with a modified RETE (a mini RETE has been grafted or attached to an existing RETE to create a modified RETE) to update the merger created suspended RETE portions regardless of source of the mini RETE.

In the illustrated embodiment, a mini RETE can be merged in one of two manners. For mini RETEs representing new rules, the merger is done such that after the merge logic "primes" the non merged, appended portion of the mini RETE, subsequent WME changes will affect the appended portion correctly (utilizing prior art RETE algorithms), as if the appended portion had been present before any WMEs were created. The prior art did not provide for such dynamic modification of RETEs and pattern matching networks by addition of nodes where the appended non merged portion could be "primed" by existing WMEs.

Mini RETEs representing on-demand pattern match requests are not permanently connected as in the above manner, because it is desired to not continuously update the non merged part of the pattern when WMEs change, but rather, only on demand, to compute that pattern matching result. After this kind of a merge process, the non merged added nodes (which constitute a suspended portion of a RETE) are kept from participating in normal RETE node updating processes which occur when WME data changes. Synapse nodes point to the drain or initial nodes of the suspended RETE portion and enable selective addressing of these added nodes. Only when the appropriate synapse nodes are accessed by programming (not shown) are the suspended portions of this kind of mini RETE used in pattern matching operations. Such accessing via a synapse node is termed a user demanded updating of these kinds of suspended nodes. When such user demanded operations are not to occur, the suspended RETE nodes are insulated by not being normally connected as successors of the main RETE, enabling faster pattern matching updates by not updating such an added suspended portion.

For a mini RETE arising out of an on demand pattern, where the pattern is to be used only once (not repeated), the process of creating a set of synapse nodes is exactly the same as for other cases. However, the merged portion of a mini RETE built from top level match patterns need not stay in the main RETE. Rather, once the pattern match operation is finished, then any part of the mergence can be deleted if not otherwise needed (such deletion may occur when rules are deleted). Match output of such mini RETEs is obtained and the connection via the synapse node can be removed. Also, it is enough to have address pointers of synapse nodes in order to refer to necessary memory items. A practical application of this kind of on demand without reuse patterns, which is a one time temporary merger, is to obtain information from RETE 10 without really changing it. Such accessing is an information retrieval operation of information stored in a RETE and which is identifiable by match patterns. Alpha and beta node compatibility requirements for a nodal merger are extensive. The nodes must not only be of the same type, but any tests described or defined in the two candidate nodes must have the same tests. The general rule for mergence of two RETE candidate nodes of the same type (alpha, beta or alpha distribution) is that all of their respective predecessor nodes exhibit mergence and the two candidates themselves exhibit mergence. For the two input beta nodes, the predecessor mergence requirements are extended to both the LHS and RHS inputs.

In the recursive scanning and analysis done initially to determine the mergence of a mini RETE with a main RETE, only two mergence marks are used for identifying the merge test results, either T (successful merge test or merge pass) or NIL (unsuccessful merge test or merge fail). A mini RETE node being analyzed can have mergence with an original RETE node but not be the finally merged node of the mini RETE—that is, it may not be the lowest successfully merged mini RETE node.

Figure 7:
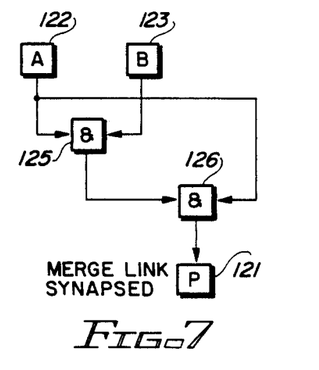

In a preferred embodiment of RETE mergers, mini RETEs are first self-merged to eliminate duplicated data structures. This self-merger is similar to the original compiling of a RETE from a set of rules. FIGS. 6 and 7 illustrate, in a simplified form, a self-merging process. The FIG. 6 illustrated mini RETE includes single output or bottom node P 121. The mini RETE's top nodes include two identical A nodes 122 and 124 plus node B 123. The topmost nodes in this illustration are alpha distribution nodes. The beta portion of this mini RETE consist of the two beta join nodes 125 and 126 having the illustrated logical connections. Such mini RETEs can be constructed from pattern specifications of rules, or from the pattern specifications of on demand pattern match operations (either repeatable or not). Such constructed mini RETE has no node sharing, as shown in FIG. 6. Each node in such a mini RETE has but one immediate successor node as opposed to many immediate successor nodes in a merged RETE. Self-merging eliminates duplicated nodes for simplifying the RETE merger processing.

FIG. 7 illustrates the structure of the FIG. 6 mini RETE resulting from a self-merger. The illustrated self-merger eliminated top A node 124. The RHS input to join node 126 is moved from A node 124 to surviving A node 122. Such reconnection is effected by changing the pointers in the two nodes. In join node 126 its PRP field 70 (FIG. 3) is changed to point to node A 122 rather than point to node A 124. The address of join node 126 is added to PRS 72 (FIG. 3) of A node 122; A node 124 is erased. This action completes the simple self-merger of this mini RETE. It is to be understood that in a practical embodiment, the mini RETEs can take more complex structures. Self-merger is a known pattern matching process. Since no mini RETE has been updated with input patterns, there is no need for creating a synapse node; the prior art self-merger also did not create synapse nodes.

Figure 8:
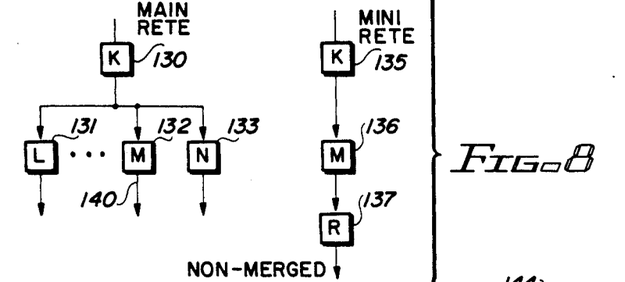
FIGS. 8 and 9 illustrate network merge break and link steps of the present invention.
Figure 9:
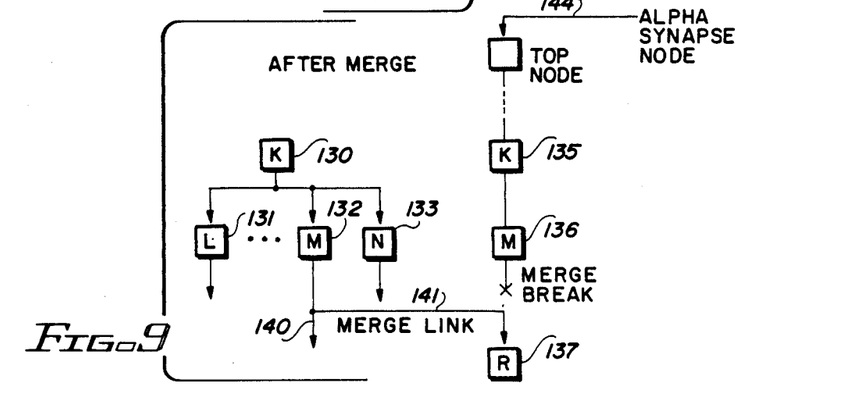

FIGS. 8 and 9 show in simplified form, a merger of a mini RETE into an existing or main RETE and the creation of a single alpha synapse node. The main RETE is partially shown as one input nodes, presumed to be in the alpha portion of a RETE. The mini RETE being merged is presumed to be from a new rule being permanently attached. Top mergeable node K 130 of the main RETE has one input and a plurality of immediate successor L, M and N nodes 131-133. M node 132 has output 140 which is involved in the described RETE merger. The successor nodes of the other nodes L 131 and N 133 are omitted for brevity. The ellipsis between nodes 131 and 132 indicate that additional immediate successor nodes are connected to node K 130. The mini RETE to be merged with the main RETE has a top one input node K 135 which has mergence with node K 130 of the main RETE. Mini RETE node M 136, the immediate successor node to node K 135, has an immediate successor node R 137. The illustrated three node portion of mini RETE 135-137 has two nodes 135 and 136 exhibiting mergence with main RETE nodes K 130 and M 132. The two nodes K 135 and M 136 are erased by the merger processing while node R 137 and its successor nodes of the mini RETE are grafted to and become a part of the main RETE.

FIG. 9 illustrates the modified main RETE after merger of the mini RETE 135-137 into the original main RETE. The only changes from the FIG. 8 illustration is the reconnection of the top non-mergeable node R 137 to merge node M 132 of the main RETE. In this case, the node M 136 is the finally merged node. This reconnection results in a merge link 141 being established between node R 137 and merge node 132. Then, the top node, which is upwardly reachable from the finally merged node M 136, is recognized as an alpha synapse node, as later described. Merge link 141 is effected by changing the pointers in the nodes M 132 and R 137. Since one input alpha nodes are involved in the merger, the PPRED field 61 (FIG. 3) of node R 137 is changed to point to node M 132 while the address of node R 137 is added to field DVEC 63 (FIG. 3) of node M 132. Created alpha synapse node 144 is a single pointer pointing to the top node which is upwardly reachable from the finally merged node M 136 identifying that node as an uppermost or top node of the mini RETE. Remember that none of the memory nodes (not shown, such as the successor alpha distribution and join nodes of node R 137) are not now updated with pattern information. To complete the initialization of the just appended portion of the modified main RETE of FIG. 9, a later described appropriate updating procedure is employed upon completion of the RETE merger.

Figure 10:
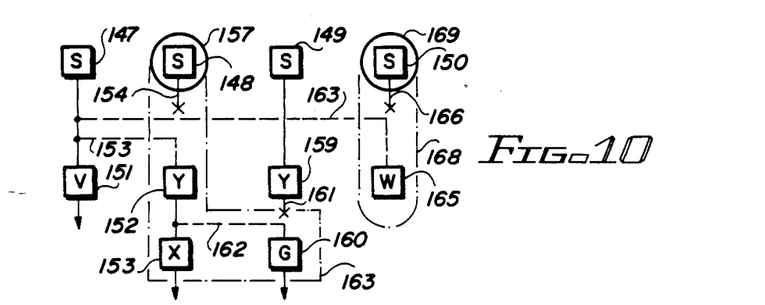
FIG. 10 illustrates the reachability properties of synapse nodes created for the FIG. 1 illustrated pattern matching network.

FIG. 10 illustrates a merger of a mini RETE into a main RETE which results in two synapse nodes being created. This illustration also shows a principle of "reachability" in determining when to create a synapse node and to minimize the number of synapse nodes while maintaining accurate updating of a grafted RETE after completion of a merger and for controlling on-demand pattern matching. Reachability between first and second nodes means that the first node is either a predecessor node or a successor node to the second node; that is, the second node can be logically reached by following established logic paths of the network. Again, alpha nodes are shown; the same procedures and principles apply to merging alpha distribution nodes and beta nodes. Only the two nodes 147 and 151 are shown of a much larger main RETE. Main RETE top node S 147 is a RETE input node having alpha node V 151 as one of its immediate successor nodes. The mini RETE to be merged has three illustrated RETE input nodes 148-150 (this mini RETE has not been self-merged for illustration purpose. RETE input node S 148 has immediate successor node 152 Y which has no mergence with any main RETE node and its immediate successor node X 153 which also has no mergence with any main RETE node. RETE input node 148 has mergence with RETE input node S 147; this results in a merge break 154 disconnecting RETE input node S 148 from the node Y 152 followed by a merge link 155 of node Y 152 to RETE input node S 147, now a merge node. A first alpha synapse node 157 points to the upward reachable top node from alpha node 148.

Mini RETE nodes S 149 and Y 159 have mergence with nodes S 147 and Y 152. This merger results in merge break 161 which erases PPRED 61 of node G 160 and adds a merge link 162 (changes PPRED 61 of node G to point to node Y 152, and adds node G 160 to DVEC 63 of node Y 152) which logically attaches node G 160 (no mergence of this node with any main RETE nodes) to node Y 152.

Because an alpha synapse node has already been created for node S (when node S 157 was merged), and tokens pushed from that alpha synapse node top node (node S 157) initializes both alpha segments Y 152—X 153 and Y 152—G 160 the alpha synapse node for node S 149 is really a duplication and therefore not added to the set of alpha synapse nodes for this merge.

Figure 11:
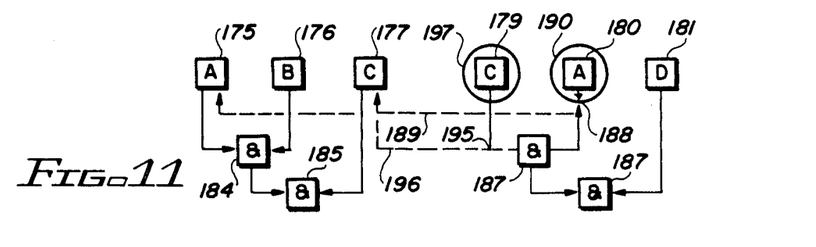
FIG. 11 illustrates beta synapse node results of an RHS merger process and added node pointers for the FIG. 1 illustrated RETE.

Another way of saying this is because of nodal reachability from synapse node 157, no synapse node is created for the erased nodes S 149 and Y 159. The principle of reachability states that if any grafted node from one RETE to another RETE is reachable from one of the current alpha, synapse nodes or a drain node of a beta synapse node, then no additional synapse node is created since activation of the previous synapse node reaches all grafted nodes that need to be updated in the grafted RETE. Dashed line box 163 illustrates the reachability of synapse node 157 to all of the nodes within box 163 from synapse node 157. The successor nodes to node G 160 are not shown, but may include both memory and non-memory nodes and may end at several different bottom nodes (not shown) just as the successor nodes of node X 153 end at bottom node (or nodes) not shown). By branching of paths in the RETE 10, a single bottom node can receive the pattern matching results from the nodes X 153 and G 160. FIG. 11 illustrates some merger controls of the present invention in this regard.

A second alpha synapse node 169 is created to reach and identify the first non-mergeable node W 165 and its successor nodes, as indicated by dashed line box 168, after its grafting to the main RETE. Node W 165 is a upper node of a succeeding list of nodes (not shown) of the mini RETE which become a second grafted RETE in this merger. Top or RETE input node 150 is merged into top or RETE input node 147 creating a merge break 166 and merge link 163 from merge node 147 and node W 165. There is no logical path from synapse node 157 to node W 165; therefore the principle of reachability requires a new synapse node 169. Alpha synapse node 169 points only to the node W 165, the top node of a grafted RETE to become a part of the modified main RETE. The above-described RETE grafting and alpha synapse node creation prevents duplicate or missing pattern matching results.

If a second synapse node were created for nodes S 149 and Y 159, activation of the additional synapse node results in the updating creating sending the token twice over merge link 161 resulting in duplicate pattern matching. Use of the principle of reachability prevents this unwanted duplication and resultant undesired pattern matching results. In the illustrated embodiment, each merger process creates its own sets of synapse nodes; that is the principle of reachability is applied to each merger independently of other mergers. The reachability principle described in the case of alpha synapse nodes can be equally applicable to the creation of beta synapse nodes without any exceptions.

That is, if a drain node candidate (a mini RETE node in the beta portion of mini RETE that is not mergeable with a main RETE node, and is the successor of a finally mergeable node) is reachable from any current alpha or beta synapse designated drain nodes, it is not added to the list of beta synapses as a drain node.

FIG. 11 illustrates a yet more complex RETE merger needed in on demand mergers. The mode of grafting shown in FIG. 11 is different from that of the FIG. 10 illustrated grafting for a rule pattern merger. In the new main RETE in FIG. 10, the created merge links include a backward and forward pointers, which point to the merge node of the original main RETE from the drain node of the grafted RETE, and vice versa. This two-way merge linking fully incorporates the grafted RETE into the original RETE such that the grafted RETE participates in all RETE operations. That is, subsequent WME data changes are pushed in a normal fashion through the entire modified RETE, including the grafted on portion. In contrast, FIG. 11 shows the partial merger using on demand generated pattern matching mini RETEs. A primary difference between FIG. 10 and FIG. 11 occurs in the linking the grafted RETE to the main RETE. The FIG. 11 illustrated linking within the RETE is limited to source or upward pointing links to the immediate predecessor merge nodes; the connection to the grafted portion is through synapse nodes. These synapse nodes can be selectively accessed on programmed user demand to complete the drain or down linking. Appropriate updating procedures, such as the later described updating procedures, are used to avoid unexpected pattern matching results. In FIG. 11, an existing main RETE includes three top or alpha distribution nodes A 175, B 176 and C 177, whose top nodes are A,B, and C (not shown), respectively, and output or bottom node P 178. A mini RETE to be merged into the existing main RETE has alpha distribution nodes C 179, A 180 and D 181 and output match or bottom node 182. The illustrated portion of the main RETE includes AND nodes 184 and 185 connected as shown. The mini RETE has AND nodes 186 and 187.

Only alpha distribution nodes A 180 and C 179 have mergence with any nodes in the illustrated portion of the main RETE. Node C 179 is merged into node C 177, see merge break 195 and merge link 196 (only backward pointer) from AND node 186 to node C 177. The node A 180 is also merged into the main RETE with node A 175. However, since the mini RETE was derived from an on demand match pattern, a full merger as described with respect to FIG. 10 is not performed; this less than a full merger results in link 196 being a one-way source or up link. Beta node 186 has its field PLP 71 changed to point to node C 177 and field PRP 70 changed to point to node A 175. During updating the grafted RETE, the two nodes (C 177 and A 175) recorded as source nodes in the beta synapse node serve as LHS and RHS source nodes; the beta synapse node associates the drain node 186 with these source nodes. For a non-repeatable on demand join, no pointers are changed in either node A 175 nor node C 177. For a repeatable on demand join, the fact that some beta synapse node specifies node 175 and 176 as a source node is recorded in node 175 and 176 in the PRSS 73 and PLSS fields, to enable proper logic for deletion of RETE portions no longer used (e.g., as long as some beta synapse uses a node as a source node, that source node may be blocked from being deleted). To update the grafted RETE consisting of nodes 181, 182, 186 and 187 the beta synapse nodes are activated creating an on-demand operation within a RETE. The mini RETE portion corresponding to the on demand match pattern of nodes 181, 182, 186 and 187 is accessed using the synapse node list for that pattern. The synapse node list is accessed from the on demand match program using normal program techniques. In cases where on demand match computations may be repeated for the same match pattern at a later time, the computation of the alpha and beta synapse nodes may be cached, and reused by the on demand programming, or the nodes may be recomputed each time.

Figure 12:
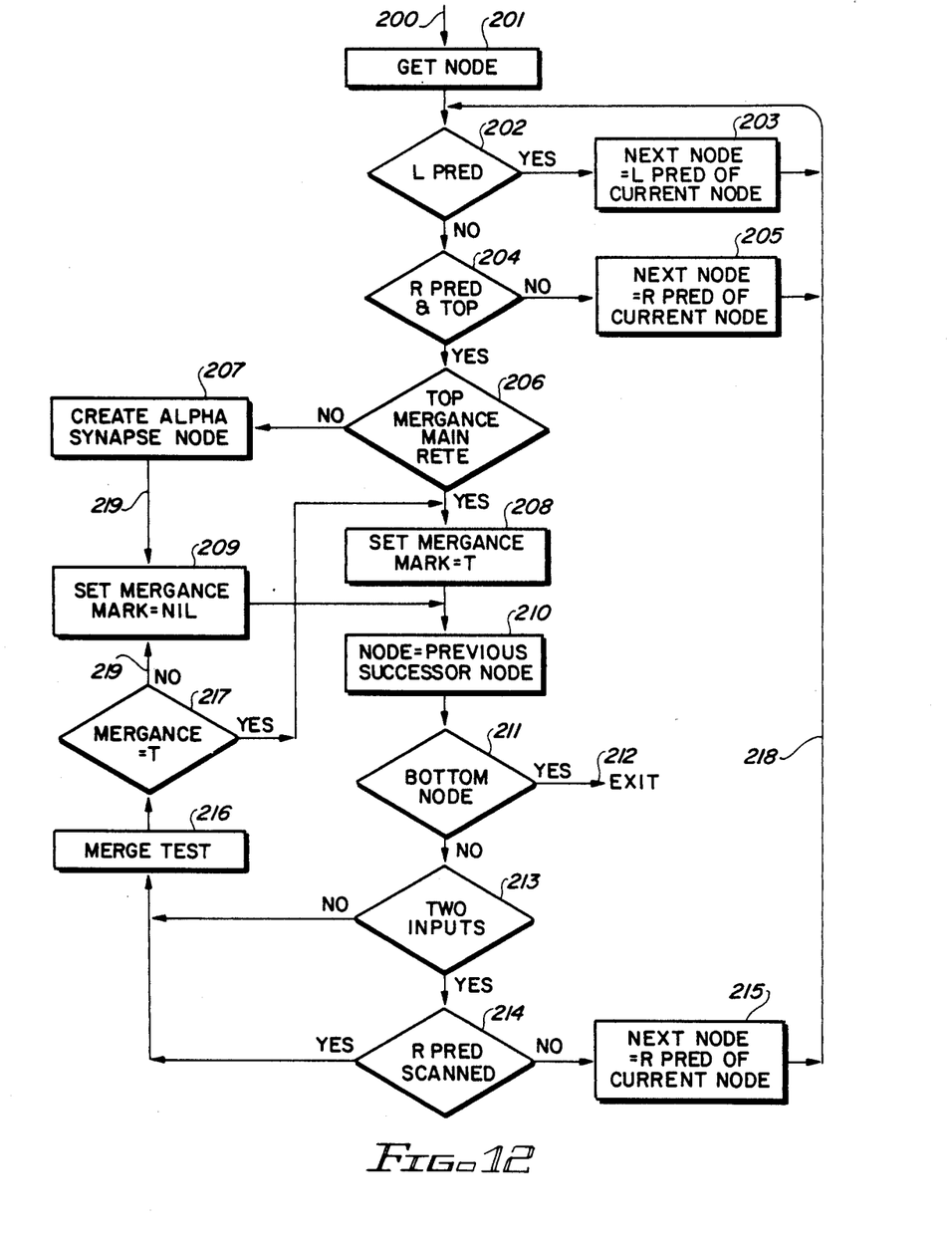
FIGS. 12 and 13 are machine operations charts illustrating, in simplified form, machine operations usable to effect RETE mergers of diverse types.
Figure 13:
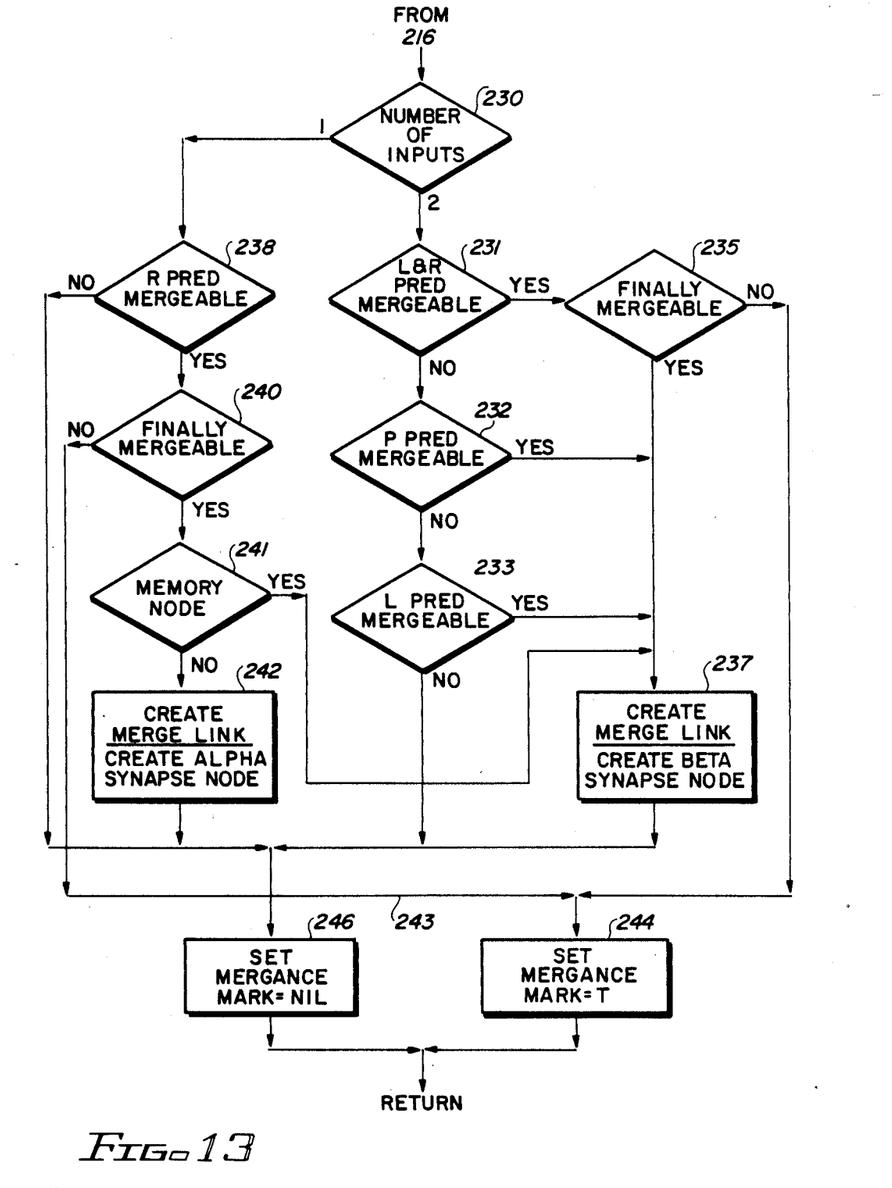

The FIGS. 12 and 13 machine operations charts illustrate a pattern matching network merger process which enables three types of pattern matching network merges; herein termed LHS, on demand with repeated use, and on demand with no repeated use, merges. FIG. 12 illustrates a first examination of each node in a mini RETE for mergence during a merge operation. This figure details the merge step 32 of FIG. 2 as implemented in the illustrated embodiment. The description assumes that the mini RETE has already been self-merged. Self-merged is a term known in the art and merely means that redundant nodes and connections have been eliminated from the mini RETE, and as described above. The merger process step is initiated in a usual manner as signified by arrow 200. First, at machine step 201 a mini RETE node to be examined is fetched (a fetched node is the "current" node being examined) into the processing memory portion (not shown) of the computer.

The merge process begins with walking up the mini RETE from the bottom node in recursive manner. The term "walking up" means that the program analyzes nodes of the mini RETE in a scan of the nodes beginning at the lowermost node and proceeding to successively logically higher nodes. i.e. predecessor nodes in the mini RETE. At machine step 201, the bottom node of mini RETE node is fetched (such as production or match nodes). The walk up of a mini RETE continues until a top node is reached. Once a top node be reached, a scan of the mini RETE nodes beginning at the top node of the mini RETE downwardly is made to find the lowest mini RETE node having mergence with an existing node in the existing or main RETE. The mergence tests continue until (1) no more mergence tests are necessary, or (2) the bottom node of the mini RETE is encountered (at machine steps 211 and 212).

If a mini RETE node scanned is a two input node, the LHS predecessor of the node is examined first. At machine step 202 the node type (e.g., field type 60 or 67) is examined to ascertain whether or not an immediate LHS predecessor node exists. If the beta node has an LHS predecessor node (yes at step 202), then at machine step 203 that predecessor node data structure is obtained using the PLP 71 stored address pointer. In case of an one input node, in steps 204 and 205 (step 205 fetches the predecessor node), the walk up process continues until a top (class) node is met. During this walk up, the nodes from which the upward walk progresses are pushed into a stack or similar data structure (may be implemented by recursive calling) to enable finding in later step 210 the node from which the upward walk came. Note that the input of an one input node is called the RHS input (predecessor). If the node only has an RHS input, at machine step 204 a test is conducted to see if its RHS predecessor is of a top node. Whether or not the node is a top node is determined by reading its type field (FIG. 3). The top nodes have the same data structure 58 as the alpha nodes; a difference being that type field 60 indicates an input (including class node) node and the PPRED field 61 stores the class name or identification instead of an address pointer, in a preferred embodiment. Unless the current node is a top node, the walk up process is recursively repeated using step 205 until a top node is reached. On the other hand, if the node is a top node, then an attempt is made in step 206 to identify a top node in the existing main RETE in the same class.

Nodal mergence is determined using known algorithms for comparing RETE nodes; a flag is created which indicates if T, that the merge was successful (it is NIL, otherwise). A successor of a node is termed the previous successor, among possibly multiple successors, if it is a node through which the current node is scanned. The resulting flag is passed down to its previous successor to provide the state of mergence of its predecessors. At machine step 206, the main RETE top nodes 21A et seq. are scanned for mergence with the mini RETE node. If an attempt to find a mergeable top node in the existing main RETE fails at machine step 206, which cumulatively represents the series of nodal comparisons in the scan, then no mergence between the mini RETE node and any main RETE node was found. As a consequence, machine step 207 adds the mini RETE top node as a new input node to the existing RETE, such as node 41, FIG. 1. Additionally, an alpha synapse node is created, pointing to node 41, and added to the list of alpha synapse nodes for this merge. This is subject to the above described reachability restrictions to prevent duplicate synapse nodes being created. At the same time, the flag NIL is passed to its previous successor node in order to signal that the mergence examination has stopped. A success in locating a mergeable top node in the existing RETE passes the flag T to its previous successor to signal that more merge tests are needed to find a finally merged node.

Each test for possible nodal mergence is started at machine step 210 from the successor of current node. When scanning a beta portion of a mini RETE, the LHS input of each mini RETE node is first analyzed, then the RHS input of such mini RETE node is analyzed as in machine steps 202 and 214. If both of LHS and RHS inputs have mergence with a main RETE node (at machine step 231 in FIG. 13), then the mini RETE node being examined is tested for mergence with the main RETE in step 216.

If a mini RETE node is merged into a main RETE node, then it implies that all of the predecessor nodes in the mini RETE located above the current node have mergence with appropriate main RETE nodes. The term main or existing RETE candidate node for a mini RETE node being examined for mergence (other than a top node of the mini RETE) means those main RETE nodes which are successors of an immediate predecessor node which is merged with a corresponding immediate predecessor node of the examined node in a mini RETE.

Step 214 determines if more mini RETE nodes, which are predecessor nodes of the node being examined, are to be examined for mergence with main RETE nodes. If yes, then the computer follows a logic path including step 215 at which another node is fetched for repeating steps 202-213 for the mini RETE node one step above (more remote from the bottom node of the mini RETE) the currently examined mini RETE node. The just described iterations repeat until one of the two terminating conditions described above is met. At machine step 216 the mergence of an examined mini RETE nodes with main RETE candidate nodes is tested. The merge algorithm insures that a node is not merged unless all of its predecessors are first merged successfully.

The value of the mergence mark from the merge tests is propagated to its previous successor as defined above. If nodal mergence is not found at machine executed step 217, then the mergence mark is set to NIL at step 209. Path 219 leading to step 209 is shown in two parts for convenience. If the mergence mark equals T at step 217 (yes condition), then steps 208 et seq. are repeated.

The machine operations chart detailing the creation of synapse nodes from merge testing is shown in FIG. 13. FIG. 13 also shows details of the machine steps used in handling one and two input nodes to test if it is possible to merge such a mini RETE node with an existing main RETE node and then merging the nodes whenever mergence is found. Entry at path 216 can occur at diverse locations of the above described charts of machine operations, such as at the respective merge indicated steps. FIGS. 12 and 13 illustrate merge marks, which are result of merge tests, denoted by either T or NIL, such as at machine steps 208, 209, 244, and 246. The merge mark T means that a nodal mergence in a mini RETE with a main RETE node is possible, whereas its being NIL denotes the merge test fails. Hence, if the merge mark is NIL, then no more merge tests are needed while scanning nodes downward to the bottom of a mini RETE.

At machine step 230 in FIG. 13, a mini RETE node is classified in terms of its type; one or two input node. In case the node is a one input node, a nodal mergence is tested whenever its RHS predecessor passes down T as the mergence mark (step 238). If it is, then that current mini RETE node is tested with respect to a main RETE node to check whether they can be merged. If the merge test, at machine step 240, shows that two nodes are mergeable (corresponds to exit labeled "NO"), then the mini RETE node may not be yet fully merged and so more merge tests are conducted (step 243) by sending the merge test result, T, to its previous successor. At this moment, if the type of the node passing the merge test is the alpha distribution, then the forward pointer from the predecessor in the mini RETE to this node is deleted to obtain correct match results. On the other hand, if they are not mergeable (corresponds to exit labeled "YES" in 240), the predecessor mini RETE node is the last mergeable node in the chain of nodes for this portion of the mini RETE leading toward the bottom or output node, and is called the finally merged mini RETE node. At this point, synapse nodes are created to record the connection points between the pre-existing main RETE nodes and the non-shared portion of the mini RETE not successfully merged with main RETE nodes. At machine step 241, the test determines if the predecessor node has associated result memory information; an example of this occurs when the predecessor node in the main RETE is an alpha distribution node. If it does not have associated result memory, then, at step 242, an alpha synapse node is created. If it has associated result memory, then a beta synapse node is created.

A two input node is eligible for mergence testing only if both of the LHS and RHS predecessor nodes pass a merge mark T at machine step 231. Merge tests for two input nodes is similar to those in one input nodes. In one input node, if a mini RETE node under test is mergeable with a main RETE node, then mergence is found.

In case of two input nodes, another condition is to be satisfied as well as the node mergence; this condition is the relationship of a node under test and its LHS and RHS predecessor nodes in the mini RETE is consistent with those comparable nodes in the main RETE. At machine step 235, such merge tests are performed. If merge tests are successful, then more subsequent merge tests are needed to achieve maximal sharing as shown in machine steps 236 and 244. On the other hand, if merge tests fail, then the RETE merger occurs as described above, and a merge link together with a set of beta synapse nodes (as needed) are created. At a two input node in a mini RETE, if the mergence marks passed from two predecessor nodes are T and NIL, as at machine steps 232 and 233, then the mini RETE predecessor node passing the T flag is finally mergeable. Thus, a merge link together with a set of beta synapse nodes are also created at machine step 237.

When a mini RETE node is verified as being finally mergeable, then above described merge breaks and links are created. At the same time, synapse nodes are possibly created. However, before creating synapse nodes, at machine steps 237 and 242, some tests (not shown) are needed to avoid obtaining erroneous match results. A new alpha synapse node is created unless it be the same as one of existing alpha synapse nodes. Similarly, if the mini RETE node is a successor node to an existing alpha or beta synapse node, it is merged into a main RETE node but no beta synapse node is created. Otherwise, a merge link and a synapse node is created. Recall that one of the objectives of the merger process is to obtain a correct set of synapse nodes. The term "correct set" means that a minimal number of synapse nodes are created that do not have overlapping successor nodes nor that miss added or grafted successor nodes from a mini RETE.

The final stage of the demand driven pattern matching is updating the grafted RETE. Unlike updating for rule LHS match patterns or on demand with non-repeated use patterns, matching, the on-demand matching with repeated use updating needs a preprocessing of clearing all memories in the nodes of the on-demand grafted RETE before token pushing operation starts, except the first updating. (Note that this is just one embodiment; other embodiments may for example accumulate token changes at synapse nodes, and push these changes into the non-shared portion of the on demand RETE.) The grafted RETE for the on demand pattern is then updated by using a set of saved synapse nodes. Updating of the grafted RETE can be achieved by using the generalized update principles of RETE, as more fully described in the co-pending commonly assigned application for patent. While applying the generalized update algorithm, the order of sending tokens from beta source nodes (or WMEs from alpha synapse nodes) is not important.

As an alternative to the generalized update method described in the co-pending application for patent, an alternative update algorithm that takes advantage of the special case represented by the synapse nodes may be used. The procedure of the optimized update algorithm is more efficient both in time and space compared to the previous generalized update algorithm.

The optimized algorithm is enabled by the following restrictions viz. the general case. First, the source nodes contain only "suspended" tokens, and no "finalized" tokens. A suspended token is one that has been received by a memory node but not yet pushed or propagated to successor nodes of the receiving memory node. A finalized token is one that has been received by a memory node and has been pushed to successor nodes which include at least one successor (can be an immediate or remote successor node with intervening successor nodes) memory node. Second, the operation being performed is ADD, not modify or remove (deletion). The optimized algorithm updates a suspended RETE portion in two phases: a beta updating phase followed by an alpha updating phase.

In beta updating all tokens stored in right source nodes are NOT sent to drain nodes; neither are they "shadowed" as described in the co-pending application for patent. Thus, the first two steps of the generalized update algorithm done separately for each token, are omitted. Updating the grafted RETE is done by performing the last step of the generalized update algorithm using a particular order of processing the token sending, using a so-called "ascending" scan of drain nodes. The token send order is determined by reachability among drain nodes, as is fully described in the co-pending application for patent. If a drain node is downwardly reachable from another drain node, then the former one is processed first. Note that the sequence of drain nodes created while merging a mini RETE is the same as the ascending order. Therefore, the drain node ordering may be obtained as a side effect of the processing to determine mergence, with no extra scanning. In an ascending updating, a lower drain node (closest to the bottom or output node) among subsets of mutually reachable drain nodes is processed before higher drain nodes. In case there is no reachability relations between some drain nodes, the order of processing to these drain nodes is arbitrary. When a drain node is processed in this step of the optimized update algorithm, the attached source node (to the LHS input) sends all of the tokens in its associated result memory to the drain node, as an ADD token. After the beta updating, if there any alpha synapse nodes were created during the merge process, then corresponding WMEs to alpha top nodes pointed to by the alpha synapse nodes are sent to the alpha top nodes associated with the alpha synapse nodes, and thereby on to all connected successors of those top nodes, in an arbitrary order. Updating at each individual node is the same as in the prior art.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of operating a pattern matching network;
   including the machine-executed steps of:
   arranging the pattern-matching network of a plurality of pattern-matching nodes into a plurality of rule-defined logic paths extending through the network from an input side to an output side;
   arranging the network for a logic flow of pattern matching operations through said logic paths from said input side toward a logical lower output side, assigning certain ones of said nodes as input nodes to the logic paths and other ones of said nodes as output nodes of such paths at said output side;
   establishing and logically connecting in said pattern-matching network a plurality of pattern matching modules each of which have a plurality of said pattern-matching nodes for respectively receiving and supplying pattern-matching information items from and to predetermined ones of said pattern matching nodes logically outside of the modules and within said network for sharing pattern-matching information with pattern-matching nodes outside of the modules;
   in said network outside of the respective modules, designating a one of the nodes as a source node for the respective modules;
   creating and maintaining pointer constructs respectively pointing to the designated source nodes and to said modules; and
   operating the pattern-matching network to include or exclude predetermined ones of said modules in or out of a given pattern-matching operation, including accessing the included modules via said respective pointer constructs.

2. In the machine-effected method set forth in claim 1, further including the machine-executed steps of:
   conducting pattern matching tests in ones of said nodes outside of said modules;
   establishing a first plurality of memory nodes in the pattern matching network which include memories for storing partial match results and each time when conducting tests with respect to said first plurality of nodes storing results from tests in the memory nodes; and
   making a one of said memory nodes to be a one of said source nodes.

3. In the machine-effected method set forth in claim 2, further including the machine-executed steps of:
   at diverse times, adding other modules to the pattern matching network at respective diverse locations in the pattern matching network including designating a one of said memory nodes as a source node for the respective added modules; and
   for each added module adding a pointer construct pointing to the respective designated source node for each of said added modules.

4. In the machine-effected method set forth in claim 3, further including the machine-executed steps of:
   designating ones of the modules respectively as LHS merged, RHS merged or top level merged modules; for the LHS merged modules, after updating the modules, discarding respective pointer constructs and establishing pointers in said modules and source nodes such that the modules become an integral part of the network;
   for the RHS merged modules, after updating the modules, retaining the respective pointer constructs and not including any pointer in the respective source node for the RHS merged modules such that the only access to such RHS merged modules is through the respective pointer construct; and
   for the top level merged modules, after updating the module, taking the result and removing the pointer construct and the module from the network.

5. In the machine-effected method set forth in claim 3, further including the machine-executed steps of:
   selecting the pattern matching network to be a RETE network having alpha nodes and beta nodes with alpha distribution nodes logically connecting the alpha nodes and the beta nodes, all RETE input nodes being alpha nodes and all output nodes being beta nodes, making said alpha distribution nodes to be intermediate ones of said first plurality of nodes;
   creating addressable alpha modules and storing all results of such alpha modules in predetermined ones of said alpha distribution nodes; and
   creating alpha ones of said pointer constructs to point to a top alpha node of the respective alpha modules.

6. In the machine-effected method set forth in claim 5, further including the machine-executed steps of:
   designating some of said beta nodes as memory nodes and all of said alpha distribution nodes as memory nodes;
   creating beta modules each with a plurality of pattern matching nodes such that the module is for attachment to a one of said memory nodes, respectively;
   creating pointer constructs for each of the beta modules which respectively point to the designated memory module and to the beta module;
   designating ones of the beta modules respectively as LHS merged, RHS merged or top level merged modules;
   for the LHS merged modules, after updating the modules, discarding respective pointer constructs, and adding pointers in the modules and source nodes such that the modules become an integral part of the network;
   for the RHS merged modules, after updating the modules, retaining the respective pointer constructs and not including any pointer in the respective source node for such modules such that the only access to such RHS merged modules is through the respective pointer construct; and
   for the top level merged modules, after updating the module, taking the result and removing the pointer construct and the module from the network.

7. In a machine-effected method of merging first and second pattern-matching networks into a single network, each of the networks to be merged having a plurality of pattern-matching nodes arranged such that ones of the nodes scanned before other nodes in a pattern-matching operation are predecessor nodes to the subsequently scanned nodes while the subsequently scanned nodes are successor nodes, some of the nodes having two logical inputs;

including the machine-executed steps of:

defining a first logical input of each of said two input nodes as a variable input and a second logical input of each of said two input nodes as a rule input;

merging second pattern-matching network nodes having variable and rule inputs with identical input ones of said first pattern-matching network and making successor ones of the second pattern-matching network nodes successor ones of the first pattern-matching network nodes into which the variable input second pattern-matching network nodes are merged; and creating pointers to the successor nodes of the merged into first pattern-matching network nodes which are rule input nodes from the second pattern matching network.

8. In a machine-effected method of changing a first pattern-matching network having a plurality of logically-interconnected nodes, said nodes having data structures for enabling pattern-matching tests to be conducted by scanning logically interconnected ones of the nodes, some of the nodes being input nodes, others of the nodes being output nodes and yet others being memory nodes, nodes that are logically connected to other nodes for being scanned for pattern-matching operations after said other nodes being successor nodes to said other nodes, respectively;

including the machine-executed steps of:

establishing a second pattern-matching network having nodes logically compatible with the nodes of the first pattern-matching network;

comparing the nodes of the first and second pattern-matching networks and merging first nodes of the second pattern-matching network that have a predetermined identity with nodes in the first pattern-matching network and attaching successor ones of the merged nodes of the second pattern-matching network to the first pattern-matching network node into which the respective first nodes were merged and erasing the first nodes such that the first-pattern matching network includes all nodes of the second pattern-matching network which are not said first nodes; and establishing a pointer construct pointing to the module and to the source node.

9. In the machine-effected method set forth in claim 8, further including the machine-executed steps of:

during said merger, in the second pattern matching network defining join nodes having left hand sided (LHS) and right hand sided (RHS) inputs, defining a plurality of tests to be conducted between the LHS and RHS inputs, and establishing a memory in the node for storing test results of comparisons of the LHS and RHS inputs;

defining said join nodes for the first pattern matching network;

in said second pattern matching network, successively examining said join nodes beginning with an output one of the nodes and proceeding logically away from the output one node for finding a nodal identity between LHS inputs of join nodes in the first and second pattern matching networks; and upon finding a nodal identity of LHS inputs of a merge join node in the first pattern matching network with a given join node in the second pattern matching network, merging all nodes in the second network that are logically more remote from the second network output node than the immediate successor node to the said given join node with identical nodes in the first pattern matching network and grafting said immediate successor node to a lowest one of the merge nodes of the first pattern matching network as a module and designating such lowest merge node as a source node for such module; and establishing a pointer construct pointing to the source node and to the module.

10. In the machine-effected method set forth in claim 9, further including the machine-executed steps of:

designating said module as either an LHS merged, RHS merged or top level merged module;

when the module is an LHS merged module, after updating the module, discarding said pointer construct and making the module an integral part of the network;

when the module is an RHS merged module, after updating the module, retaining said pointer construct and not including any pointer in the respective source node for the module such that the only access to such RHS merged module is through the pointer construct; and when the module is a top level merged module, after updating the module, taking the result and removing the pointer construct and the module from the network.

11. In a method of merging first and second pattern-matching networks each of which having a plurality of nodes which are serially scanned in a pattern-matching operation with the order of scanning resulting in predecessor nodes which are scanned before a given node is scanned and successor nodes which are scanned after said given node is scanned;

including the machine-executed steps of:

comparing said first and second pattern-matching networks, identifying identical ones of the first network nodes with ones of the second network nodes, merging the second network nodes with the respective identical first network nodes and making successor ones of the second network nodes that were merged to be successor nodes of the first network nodes into which the second network nodes were merged; and establishing pointer means in the first network pointing to each first successor ones of the second network nodes which were made successor nodes to first network nodes, respectively.

12. In the machine-effected method set forth in claim 11, further including the machine-executed steps of:

updating the first network by successive predetermined updating scans; and erasing all of said established pointer means.

13. In the machine-effected method set forth in claim 11, further including the machine-executed steps of:

updating the first pattern matching network irrespective of said merged second pattern network;

determining that the merged second pattern network is to be updated;

accessing the established pointer means and first updating the second pattern network by complementary updating steps and then updating the first pattern matching network.

14. In the machine-effected method set forth in claim 13, further including the machine-executed steps of:

after updating the first pattern matching network, using the results of updating said second pattern network, then again not upating the second pattern matching network.

15. In a machine-effected method of operating a pattern matching network including the machine-executed steps of:

selecting an existing pattern matching network to be used;

generating match patterns that are separate from the existing pattern matching network; and merging the generated match patterns into the existing network either in a top level manner or in a grafted manner.

16. In the machine-effected method set forth in claim 15, further including the machine-executed steps of:

in said merging, selecting either an LHS or an RHS merger; in said selected merger, creating synapse nodes as said pointer constructs which point to respective ones of said source nodes of the existing network to which the match patterns are attached; and for the LHS merger, updating the network after the merger and then discarding the synapse nodes and for the RHS merger retaining the synapse nodes.

17. In the machine-effected method set forth in claim 16, further including the machine-executed steps of:

repeatedly updating the merged network except for the RHS merger grafted portion(s); and for the RHS merger grafted portion(s), accessing the retained synapse nodes for updating such portions beginning with the respective said source node.

* * * * *